United States Patent [19]

Roe

[11] 4,410,431

[45] Oct. 18, 1983

[54] COMPOSITION FOR ALTERING THE WATER FUNCTION CHARACTERISTICS OF MINERAL SLURRIES

[75] Inventor: William J. Roe, Aurora, Ill.

[73] Assignee: Nalco Chemical Company, Oak Brook, Ill.

[21] Appl. No.: 364,463

[22] Filed: Apr. 1, 1982

[51] Int. Cl.³ ............... C09K 3/18; B01D 43/00; F26B 1/00; F26B 5/08

[52] U.S. Cl. .................. 210/728; 210/727; 210/729; 210/778; 252/60; 252/70; 252/88; 252/170; 252/174.18; 252/174.21; 252/194; 106/13; 44/6

[58] Field of Search ............... 252/60, 70, 88, 170, 252/174.18, 174.21, 194; 106/13; 210/727, 728, 729, 778, 787; 44/6

[56] References Cited

U.S. PATENT DOCUMENTS

| | | | |
|---|---|---|---|
| 2,101,472 | 12/1937 | Kormann | 106/13 |
| 2,116,682 | 5/1938 | Kleinicke et al. | 44/6 |
| 2,222,370 | 11/1940 | Mori | 169/44 |
| 2,373,727 | 4/1945 | West et al. | 106/13 |
| 2,436,146 | 2/1948 | Kleinicke | 252/88 |
| 2,454,886 | 11/1948 | Shapiro | 428/350 |
| 2,716,068 | 8/1955 | Fain et al. | 106/13 |
| 3,298,804 | 1/1967 | Schoch | 44/6 |
| 3,350,314 | 10/1967 | Dawtrey et al. | 106/13 |
| 3,362,910 | 1/1968 | Ordelt | 252/75 |
| 3,624,243 | 11/1971 | Scott et al. | 106/13 |
| 3,630,913 | 12/1971 | Scott et al. | 106/13 |
| 3,794,472 | 2/1974 | Macaluso et al. | 44/6 |
| 4,117,214 | 9/1978 | Parks et al. | 252/70 |
| 4,207,186 | 6/1980 | Wang et al. | 252/60 |
| 4,225,317 | 9/1980 | Kugel | 44/6 |
| 4,285,841 | 8/1981 | Barrat et al. | 252/174.21 |
| 4,339,338 | 7/1982 | Blake et al. | 252/70 |

*Primary Examiner*—John E. Kittle
*Assistant Examiner*—Robert A. Wax
*Attorney, Agent, or Firm*—John S. Fosse

[57] ABSTRACT

A composition for altering the water function characteristics of a wet, particulate mineral mass combines a surfactant material having an HLB number of from about 6.0 to about 12.0 with a surfactant adsorption inhibitory amount of a fatty acid substance.

10 Claims, 6 Drawing Figures

FIG. 2

Coal Dewatering Results

FIG.3

Coal Dewatering Results

FIG.4
Lead Concentrate Batch Filtration Results

FIG. 6

Taconite Concentrate Filtration Results

COMPOSITION FOR ALTERING THE WATER FUNCTION CHARACTERISTICS OF MINERAL SLURRIES

FIELD OF THE INVENTION

This invention relates generally to chemical processing aids for use in conjunction with mining operations, and relates more particularly to chemical compositions for altering the water function characteristics in various bulk mineral handling procedures. In one specific aspect, the present invention relates to chemical aids for dewatering coal, lead and taconite ores, glass sands and the like.

BACKGROUND OF THE INVENTION

Water is commonly employed in coal crushing and washing operations as a vehicle and to collect and suppress fines. However, water is desirably removed from cleaned coal prior to delivery of the product to a user for two important reasons. First, surface moisture much in excess of about five per cent can result in serious freezing of coal in railroad cars when shipment is made in sub-freezing weather. Second, and more importantly, any included moisture acts as a B.T.U. thief, the fuel value of clean coal being an inverse function of its moisture content.

In the past, partial dewatering of coal slurries has been accomplished by such procedures as filtration and centrifugation, sometimes followed by thermal drying to a target moisture level. In addition, dewatering aids have been utilized heretofore in instances where the cost effectiveness of the chemical additives exceeded the incremental equipment charges and related energy costs. One commonly employed dewatering aid has been a surface active chemical species known generically as sodium dialkylsulfosuccinate; but this material is often prohibitively expensive in its application; and usually exhibits a very significant foaming tendency, and therefore has limited utility.

Generally similar considerations obtain with respect to other particulate mineral masses.

SUMMARY OF THE INVENTION

The present invention resides in a special composition of a surfactant material having advantageous hydrophile-lipophile balance, in combination with a fatty acid product which serves as an adsorption inhibitor for the surfactant. This novel composition has been manifestly useful in reducing the moisture content of various mineral products, exhibits beneficial residual effects, and test results suggest the presence of synergism in the combination. In one specific aspect, the instant invention contemplates the blending of Tall Oil Fatty Acid with an ethylene oxide adduct of a primary aliphatic alcohol of moderate chain length, such as tridecyl alcohol. Aliquot proportions of the ingredients have proved useful, while blends incorporating as much as sixty-five per cent Tall Oil Fatty Acid have exhibited less than optimum activity.

The compositions of the invention are effective at low dosage rates per unit reduction in moisture content of the selected mineral product and, if desired, can be applied neat in order to avoid the necessity of both a dilution step and the corresponding equipment. The instant compositions are also desirably non-foaming in a centrate and act advantageously to modify the freezing characteristics of clean coal that has been dewatered by their use.

It is therefore a general object of the present invention to provide a new and improved composition for altering the water function characteristics of mineral slurries.

Another broad object of the instant invention is to provide a new and improved drying aid for dewatering wet, particulate mineral masses.

Still another object of the invention is to provide a chemical agent that combines dewatering effectiveness with residual freeze protection for coal and other mineral slurries.

These and other objects and features of the invention will become more apparent from a consideration of the following descriptions.

BRIEF DESCRIPTION OF THE DRAWINGS

Data from the working examples to be described hereinafter are set forth in graphical form in the drawings wherein.

DETAILED DESCRIPTION OF THE INVENTION

The compositions of the present invention are formulated for altering the water function characteristics of a wet, particulate mineral mass by combining a surfactant material component having a specific hydrophile-lipophile balance, with a surfactant adsorption inhibitory agent. The surfactant component is selected so as to maximize its hydrophobic character without adversely affecting its water solubility; and the adsorption inhibitory agent is selected to repel the surfactant molecules from the surfaces of the mineral particles, thus keeping the surfactant in solution in the water phase where it can perform the function of lowering surface tension, thereby enhancing capillary flow of water through a solid bed as in a filtration or centrifugation, and effecting a dewatering.

The surfactant component of the invention is selected to comprise a single surfactant material or a mixture of surfactants in order to exhibit the required hydrophile-lipophile balance; and the surfactant component is advantageously selected to have an HLB number between from about 6.0 to about 12.0 and preferably between about 7.0 and about 10.0. It is speculated that it is energetically more favorable for a greater proportion of the more hydrophobic surfactant moieties to migrate and align in the mineral slurry at the air/liquid interface, rather than adsorb at the solid/liquid interface. Moreover, in the case of non-ionic surfactants consisting of ethylene oxide adducts, adsorption of the surfactant very likely would involve an acid-base interaction utilizing unshared pairs of electrons on the oxygen in the polyoxyethylene ether linkages. Thus, the higher ethoxylates not only exhibit greater water solubility but also offer a greater number of adsorption sites. Regardless of the mechanism, however, it appears that the surfactant material desirably is arranged to remain in the aqueous phase where it serves an active function, enhancing capillary flow of water through a filter cake by reducing the surface tension and the viscosity of the filtrate.

One eminently useful class of surfactants for use in the practice of the present invention comprises the condensation products of one mol equivalent of a primary aliphatic alcohol with from 2 to 7 mol equivalents of ethylene oxide. The straight chain aliphatic alcohols containing from 6 to 13 carbon atoms are particularly useful in the practice of the invention; and it has been determined that alcohols containing more than 13 carbon atoms are insufficiently water soluble whereas molecular chains containing less than 6 carbon atoms provide a surfactant molecular which is insufficiently hydrophobic. Similarly, when the alcohol is ethoxylated with more than 7 mols of ethylene oxide, the water solubility of the resultant surfactant has proved excessive.

Tridecyl alcohol is an especially useful ingredient for the surfactants used in the present invention. The adduct of one mol equivalent of tridecyl alcohol with 3 mol equivalents of ethylene oxide exhibits a highly desirable HLB number of 7.5 whereas the corresponding reaction product with 5 mols of ethylene oxide gives a surfactant with an HLB number of 9.8.

The surfactant adsorption inhibitory agent of the instant compositions is usefully selected to be a fatty acid substance. The material of commerce which is known as Tall Oil Fatty Acid, being predominantly a mixture of oleic and linoleic acids with lesser included amounts of linolenic acid and abietic acid, is one suitable adsorption inhibitory agent, particularly because of its low cost. Also effective in the practice of the present invention are commercial grades of stearic, palmitic and oleic acids. While aliquot proportions of surfactant and adsorption inhibitory agent have been conveniently utilized, the practical limits for inclusion of the fatty acid component in a neat composition according to the invention are between about 10 percent and about 65 percent by weight of the total composition. Inclusion of the fatty acid component in the present compositions has also been found to assist in solubilizing the surfactant component, particularly when the latter material approaches the upper limits of acceptable hydrophobicity.

It is postulated that additions of a fatty acid material adsorb on active sites on the particulate mineral solids thereby inhibiting adsorption of surfactant by preferential occupation of these sites, by affecting the zeta potential of the mineral particle, and possibly by sterically repelling surfactant molecules and their associated water micelle.

In the practice of the present invention, White Oil and #2 Fuel Oil are acceptable diluents which can be incorporated to promote residual freeze reduction effects in dewatered coal for example. However, the inclusion of water in the instant compositions is comparatively undesirable since its presence tends to reduce the efficiency of the composition in dewatering the particulate mineral mass.

The compositions of the present invention are added to mineral/water slurries at levels from about 0.1 to about 1.0 pounds per dry ton of the particulate mineral material. Furthermore, the instant compositions are advantageously utilized in conjunction with a mechanical dewatering procedure such as filtration, centrifugation or the like, in order to promote and accelerate the chemical dewatering action of the additive composition.

For purposes of describing the invention more fully, the following working examples are given, without however limiting the invention to the precise details and conditions set forth.

Compositions arbitrarily designated "A", "B", "C" and "D" were formulated in accordance with the invention as set forth hereinafter. In addition, for comparison purposes, a surfactant material without an adsorption inhibitory agent was included and identified as Composition "E". Certain commercial drying aids were also utilized for reference; and the formulations of these latter products are set forth below with arbitrary, numerically sequential designations.

|  | Parts By Weight |
|---|---|
| COMPOSITION "A" | |
| Tall Oil Fatty Acid | 50 |
| tridecyl alcohol ethoxylate (3 mols of ethylene oxide) | 50 |
| total | 100 |
| COMPOSITION "B" | |
| Tall Oil Fatty Acid | 50 |
| tridecyl alcohol ethoxylate (5 mols of ethylene oxide) | 50 |
| total | 100 |
| COMPOSITION "C" | |
| Tall Oil Fatty Acid | 45 |
| tridecyl alcohol ethoxylate (3 mols of ethylene oxide) | 45 |
| dioctyl sulfosuccinate, sodium salt (70% water solution) | 10 |
| total | 100 |
| COMPOSITION "D" | |
| Tall Oil Fatty Acid | 50 |
| dioctyl sulfosuccinate, sodium salt (70% water solution) | 50 |
| total | 100 |
| COMPOSITION "E" | |
| tridecyl alcohol ethoxylate (3 mols of ethylene oxide) | 100 |
| total | 100 |
| COMMERCIAL PRODUCT #1 | |
| water | 75 |
| sodium vinyl sulfonate (25%)/sodium acrylate (75%) copolymer [M.W. <20,000] | 25 |
| total | 100 |
| COMMERCIAL PRODUCT #2 | |
| dioctyl sulfosuccinate, sodium salt (70% water solution) | 85 |
| #2 Fuel Oil | 15 |
| total | 100 |
| COMMERCIAL PRODUCT #3 | |
| dioctyl sulfosuccinate, sodium salt | 40 |
| water | 60 |
| total | 100 |

EXAMPLE 1

Samples of a clean coal centrifugal dryer feed were obtained from an operating mine. A five-gallon sample of the dryer feed was filtered through a 28-mesh sieve; and the +28 mesh solids were air dried overnight and split into a suitable number of 300 g samples using a conventional rotary sample-splitting device. The −28 mesh slurry was back-added to the dry samples in the appropriate proportion, resulting in individual feed samples containing roughly 36.1% solids. A centrifuge basket was fitted with 28-mesh wire screen for the tests. A series of blank runs at various speeds and spin times thereafter indicated that an equipment setting of #1 and a spin time of one minute resulted in a moisture value of 9.3% (near the reported operating moisture value of 9.5–10.0% from the commercial mining operation). The drying aids were added as 1% solutions, and a 30-second conditioning time used. The conditioned samples were added to the stationary basket; and following complete transfer, the centrifuge was started. The centrifuged coal solids were emptied into pre-weighed pans and dried at 105° C. overnight to make the moisture determinations.

Figure 1:
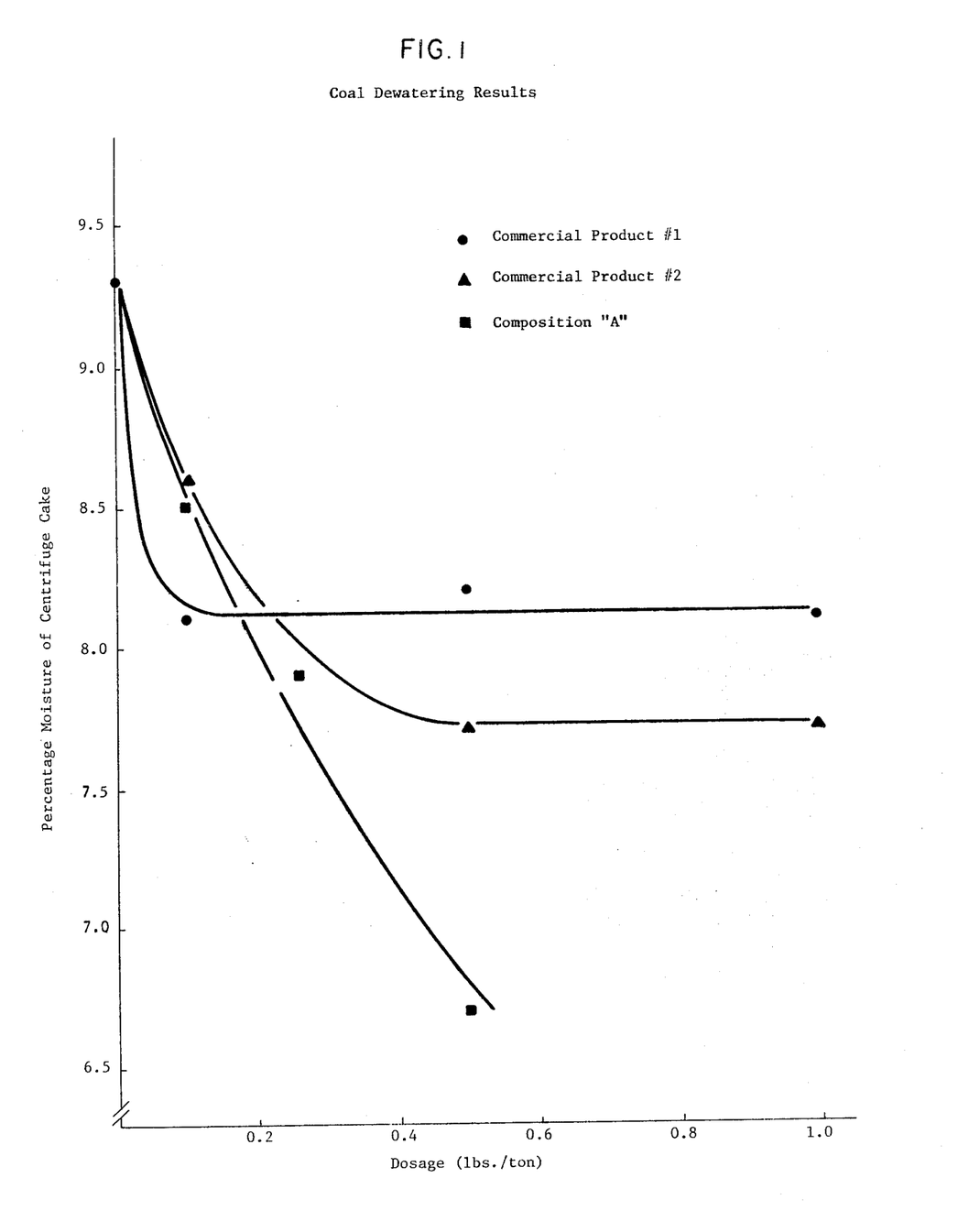
FIG. 1 is a plot of the filter cake moisture content of a particulate coal product versus the dosage rate of various dewatering aids, expressed as pounds of additive per ton of dry substrate.

The resulting data are set forth in FIG. 1.

Examination of the data shows that all of the drying aids tested exhibited positive dewatering effects. However, increasing the dosage of the two commercial products much above the rate of 0.2 pounds per dry ton achieved no additional reduction of the cake moisture content. In sharp distinction, Composition "A" of the invention reduced the moisture content to a much greater extent, specifically to 6.7% at a dosage rate of 0.5 pounds per ton. The drying aid which was designated Commercial Product #2 was also observed to cause unacceptable foaming in the centrate whereas Composition "A" produced negligible foaming.

EXAMPLES 2 AND 3

Figure 2:
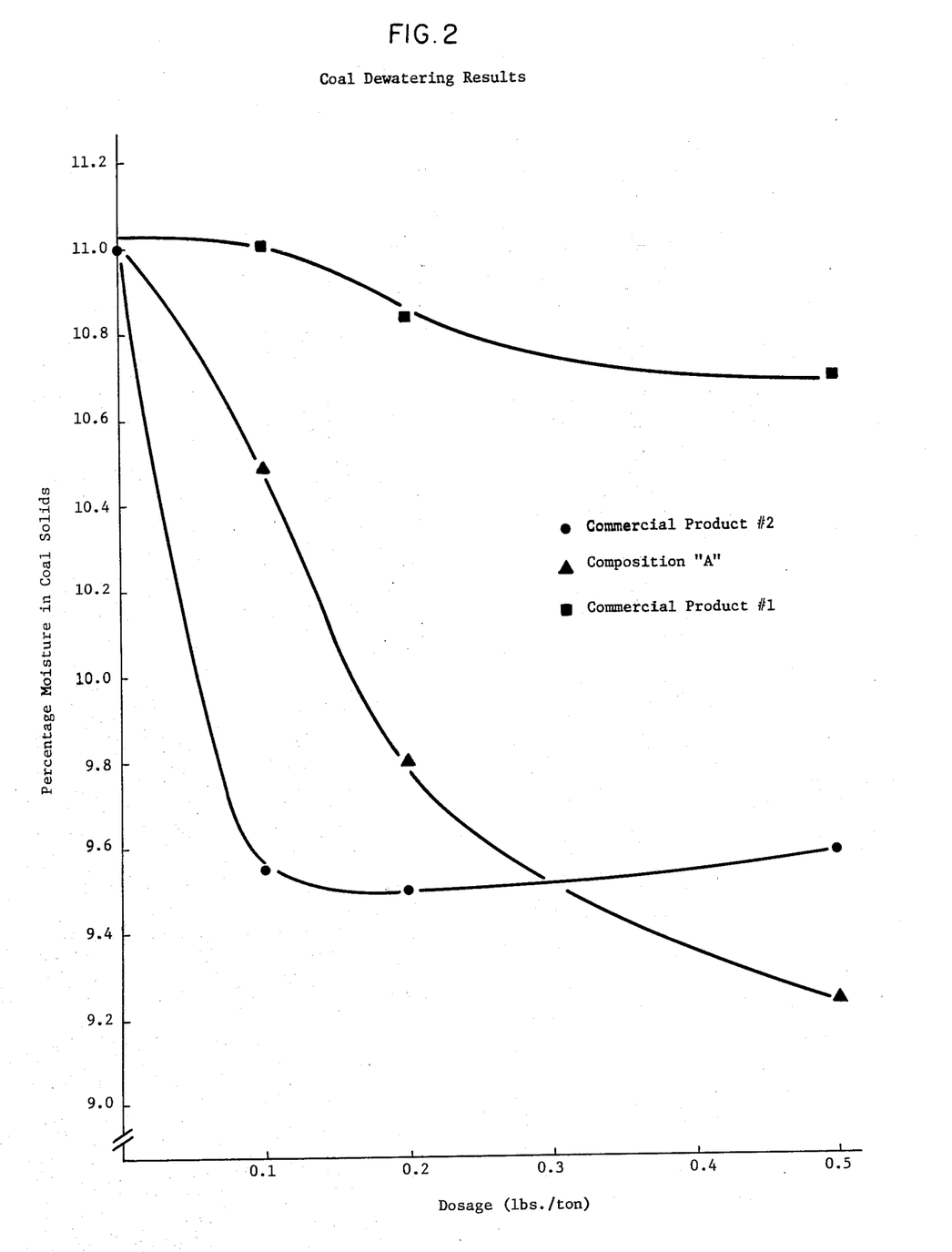
FIG. 2 is a graphical plot similar to the showing of FIG. 1 but illustrating different test runs for different drying aids.
Figure 3:
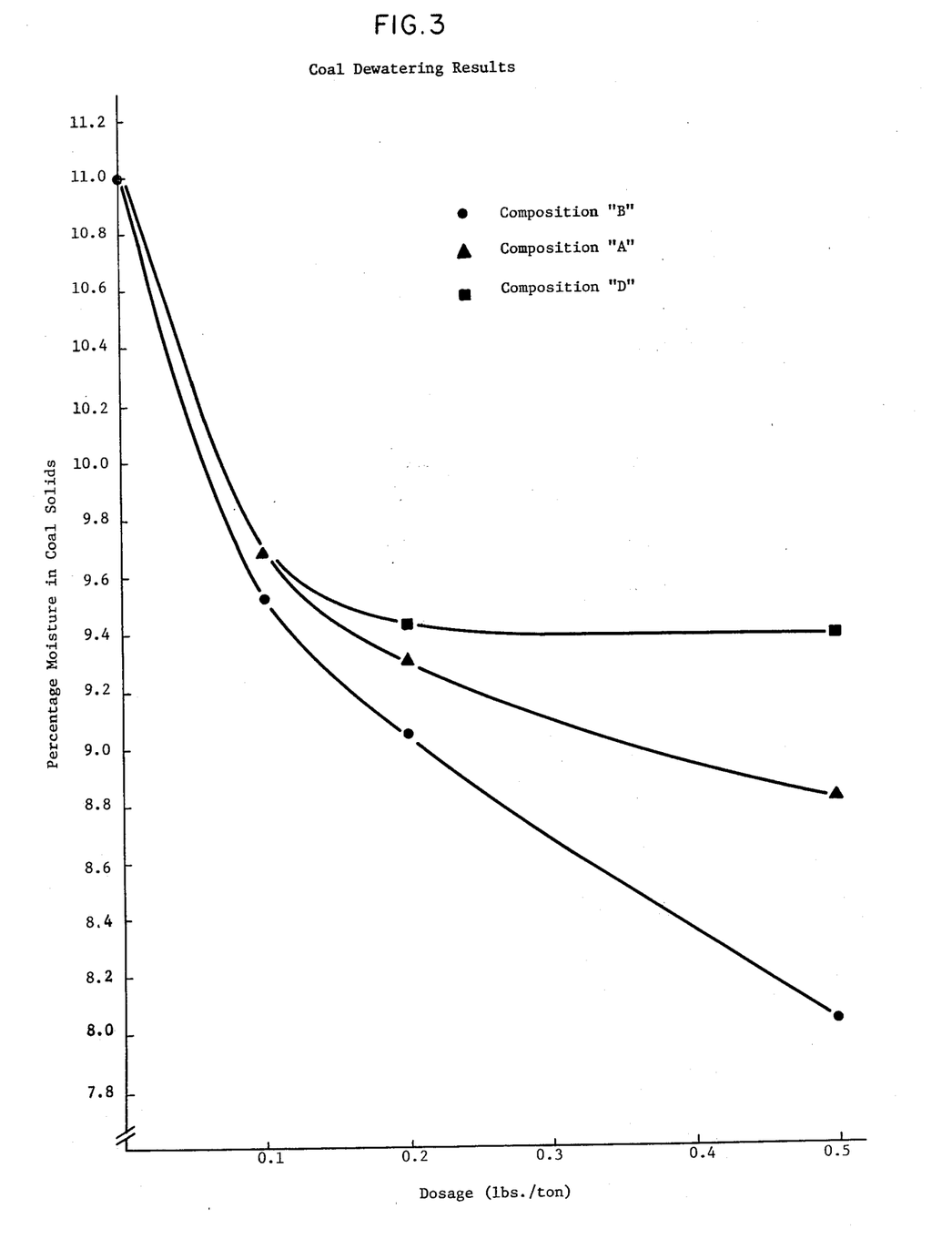
FIG. 3 is a data plot similar to the showing of FIGS. 1 and 2, but illustrating the performance of still further additive variables.

Samples of clean coal centrifugal dryer feed from a commercial coal mine were employed for the laboratory evaluation data set forth in FIGS. 2 and 3. Laboratory screening was accomplished using a bench-scale basket centrifuge that was equipped with a 28-mesh stainless steel retainer. The various drying aids were added to individual pre-split samples as 1% solutions, and the centrifuge spin times and speeds were held constant.

Examination of the data graphically presented in FIG. 2 indicates that dilute solutions of Commercial Product #2 and Composition "A" reduced the centrifuged product moisture levels significantly whereas Commercial Product #1 showed marginal activity.

Comparing the data for Composition "A" with that for Composition "B" in FIG. 3 indicates that the latter, containing the more highly ethoxylated surfactant was more effective in dewatering; whereas comparisons with the data for Composition "D" suggests that the tridecyl alcohol ethoxylate surfactant was generally more effective than sodium dioctyl sulfosuccinate surfactant.

EXAMPLES 4 AND 5

Figure 4:
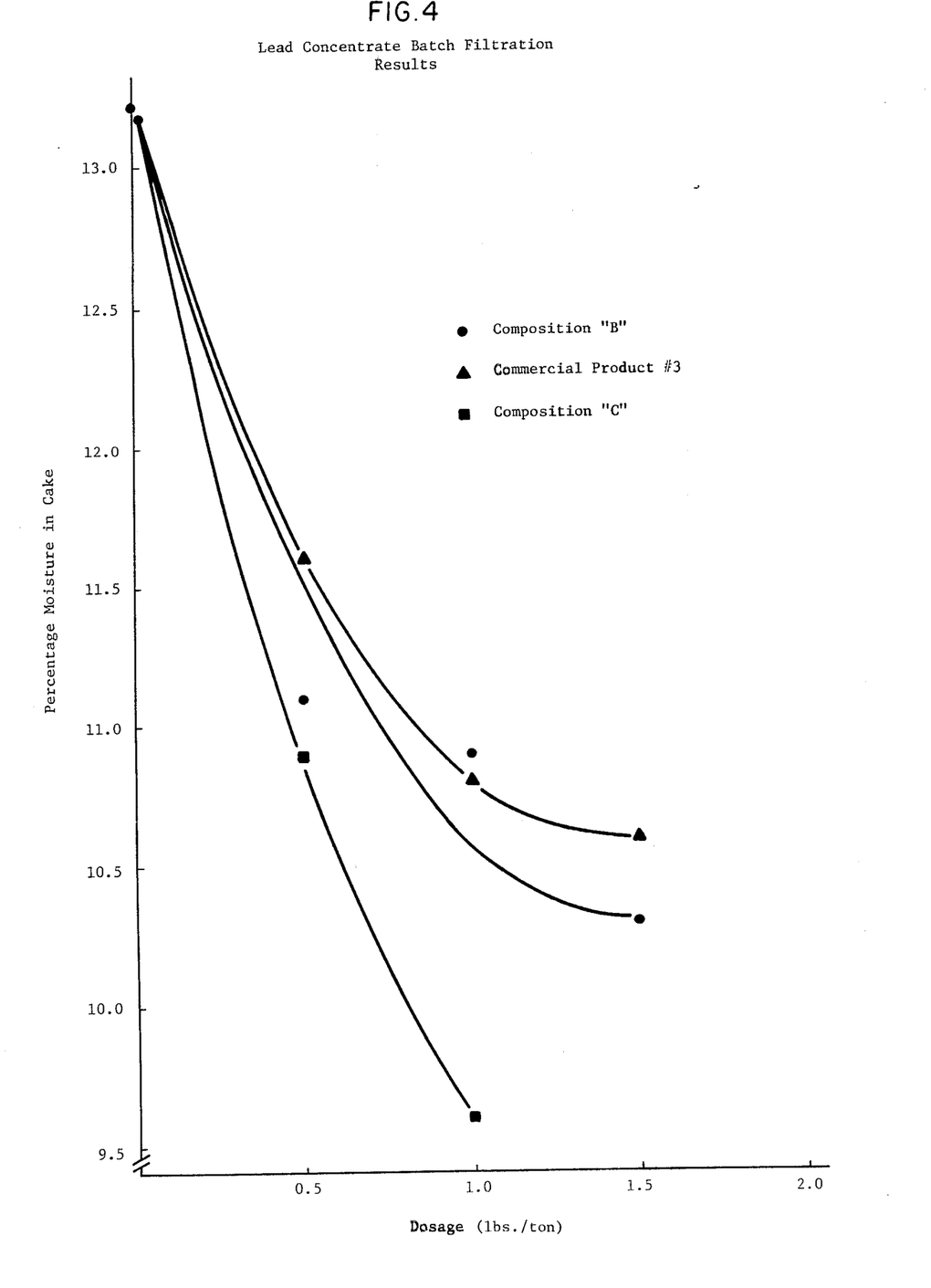
FIG. 4 is a graphical plot of the dewatering efficiency of several compositions utilized in conjunction with lead ore concentrate.
Figure 5:
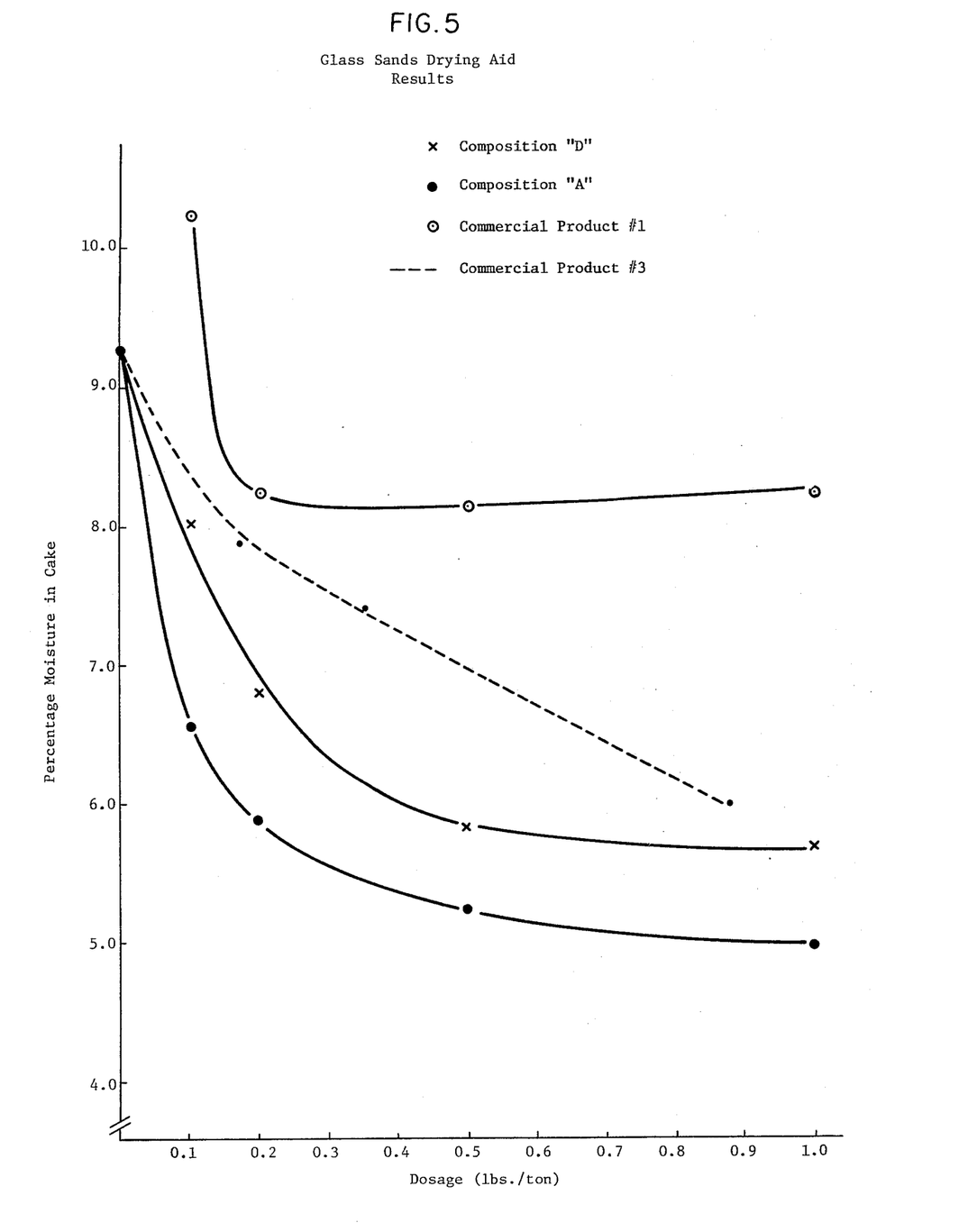
FIG. 5 is a data plot similar to those exemplified in FIGS. 1-4 but employed for dewatering glass sands.

Various commercial dewatering products were evaluated in comparison with compositions formulated according to the present invention in filtering lead ore concentrates and glass sands; and the data collected are graphically depicted in FIGS. 4 and 5 respectively. Comparison on the data for Composition "C" (with adsorption inhibitor) with that for Commercial Product #3 (without inhibitor) in the graph of FIG. 4 demonstrates the marked increase in effectiveness which was accomplished by the inclusion of an adsorption inhibitory agent, specifically Tall Oil Fatty Acid. Moreover, a comparison of the data for the commercial products with that for Composition "A" in FIG. 5 supports the distinctively worthwhile effect of compositions incorporating the adsorption inhibitory agent. The data in FIG. 4 also confirm the improved effectiveness of the compositions according to the present invention when compared with commercial formulations.

EXAMPLE 6

Surfactant alone (Composition "E") and surfactant combined with an adsorption inhibitory agent (Composition "A") were studied in conjunction with the filtration of taconite concentrates using a pilot leaf filter unit.

A filter vessel was first charged with individual, approximately 1,670 g. samples of a taconite slurry of predetermined water content. A mixer was immersed in the vessel, and mixing begun such that mild surface movement was observable.

Treatment chemicals were added via syringe and in neat form, followed by a short mixing period. Agitation was stopped prior to each dip of the filter leaf.

Using a vacuum of 25 inches, the filter leaf was immersed in the vat for about 31 seconds, followed by a 21 second steam time and a 21 second drying time. The cake was then discharged, and the wet weight recorded.

Figure 6:
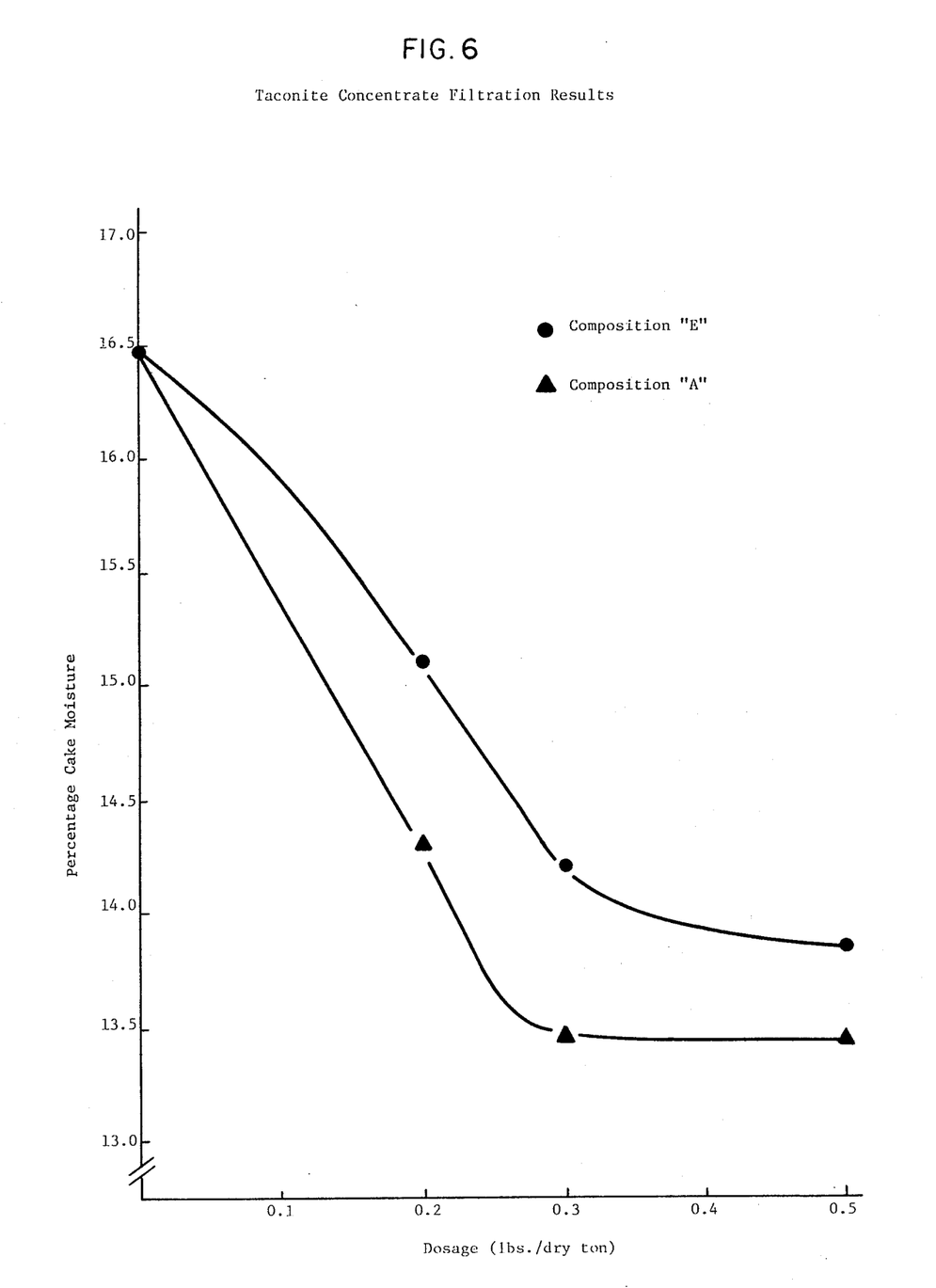
FIG. 6 is a further data plot showing dewatering effects on taconite concentrates.

The leaf was washed, and the filtration step repeated. After drying the cakes overnight, moisture contents were calculated and averaged. The resultant data are graphically set forth in FIG. 6 where the efficacy of combining surfactant and the adsorption inhibitory agent, in compliance with the present invention, is sharply demonstrated.

EXAMPLE 7

Samples of a clean coal centrifugal dryer feed were obtained from a commercial mine. The liquid portion was separated by decanting through a 20-mesh sieve and retained. The solids were air-dried for 48 hours and then split into small samples using a rotary sample splitter. The liquid was then back-added in an appropriate proportion, and the resultant samples were used in batch centrifuge testing.

A basket centrifuge was fitted with 28-mesh wire screens and used to "dry" the feed samples. Experimentation showed that a spin time of 120 seconds at setting #1 produced untreated sample moistures of 5.9%, which is near the value reported to be afforded by the dryers in the commercial plant. These conditions were used in all of the tests.

Composition "B" was added as a 1% water solution, and a 45-second conditioning time was used prior to centrifugation. Each dosage was repeated five times with four of the dried samples retained for compression tests and one used for a moisture determination.

The centrifugally dried solids were packed into individual cylinders, and placed in a freezer for 24 hours at 0° F. The frozen samples were then evaluated using a Soiltest compression test unit, equipped with a 500-pound proving ring.

At a dosage of approximately 0.2 pounds of the additive per ton of dry coal, the absolute moisture level was reduced from 5.9% by weight to 5.1% and the pressure required to fracture the frozen samples was reduced 36.1%. At a dosage of 1.0 pounds per dry ton, the corresponding absolute reduction in moisture level was 1.5% and the comparative fracture point was reduced 61.9%.

It will be apparent from the foregoing descriptions that the compositions of the present invention are highly effective at low dosage rates per unit reduction in moisture content of particulate mineral slurries. Furthermore, the instant compositions can be applied neat whereby to avoid the need for mixing equipment and are compatible in a wide range of environments. In addition, the instant compositions have been found to exhibit beneficial residual effects in altering the freezing characteristics of dewatered coal. Accordingly, the specific embodiments herein set forth are to be considered as being primarily illustrative. Various changes beyond these described will, no doubt, occur to those skilled in the art; and such variations are to be understood as forming a part of this invention insofar as they fall within the spirit and scope of the appended claims.

What is claimed is:

1. The method of dewatering a wet, particulate mineral mass which comprises the steps of: adding a composition comprising a surfactant material having a hydrophile-lipophile balance number of from about 6.0 to about 12.0 and a surfactant adsorption inhibitory amount of a fatty acid substance to a particulate mineral/water slurry in an amount of from about 0.1 to about 1.0 pounds per dry ton of particulate mineral material; and thereafter subjecting the slurry to a mechanical dewatering procedure.

2. The method according to claim 1 wherein said fatty acid substance is a mixture of fatty acids containing from 8 to 18 carbon atoms.

3. The method according to claim 2 wherein said mixture of fatty acids is predominantly a mixture of oleic acid and linoleic acid.

4. The method according to claim 3 wherein said mixture of fatty acids is Tall Oil Fatty Acid.

5. The method according to claim 1 wherein said surfactant material is the reaction product of one mol equivalent of a primary aliphatic alcohol containing from 6 to 13 carbon atoms with from 2 to 7 mol equivalents of ethylene oxide.

6. The method according to claim 4 wherein said primary aliphatic alcohol is tridecyl alcohol.

7. The method according to claim 1 wherein said fatty acid substance is present in a ratio, with respect to said surfactant material, of from about 1:9 to 2:1 by weight.

8. The method of dewatering a wet, particulate mineral mass according to claim 1 wherein said mechanical dewatering procedure is centrifugation.

9. The method of dewatering a wet, particulate mineral mass according to claim 1 wherein said mechanical dewatering procedure is filtration.

10. The method of simultaneously dewatering a coal/water slurry and reducing the freeze-adherence of the resultant product to the metal surfaces of shipping containers and the like, which method comprises the steps of: adding a composition comprising a surfactant material having a hydrophile-lipophile balance number of from about 6.0 to about 12.0 and a surfactant adsorption inhibitory amount of a fatty acid substance to a coal/water slurry in an amount of from about 0.1 to about 1.0 pounds per dry ton of coal; and thereafter subjecting the slurry to a mechanical dewatering procedure.

* * * * *